(12) United States Patent
Herbst

(10) Patent No.: US 7,731,854 B1
(45) Date of Patent: Jun. 8, 2010

(54) SITU SYSTEM AND METHOD FOR TREATING AN OIL AND GAS WELL DRILLING FLUID

(75) Inventor: Robert J. Herbst, Denver, CO (US)

(73) Assignee: H2O Tech, Inc., Castle Rock, CO (US)

( * ) Notice: Subject to any disclaimer, the term of this patent is extended or adjusted under 35 U.S.C. 154(b) by 764 days.

(21) Appl. No.: 11/707,592

(22) Filed: Feb. 15, 2007

(51) Int. Cl.
*B01D 61/00* (2006.01)
*B01D 63/00* (2006.01)
*B01D 17/06* (2006.01)
*C02F 1/46* (2006.01)
*C02C 1/00* (2006.01)

(52) U.S. Cl. .................... 210/651; 210/703; 210/748; 210/257.2; 210/175; 210/180; 204/157.15; 204/660; 205/742; 202/82; 203/10; 203/12

(58) Field of Classification Search .......... 210/650–64, 210/195.2, 257.2, 175, 180, 702, 748; 204/269, 204/157.2, 660; 205/744, 242; 203/10, 12; 202/82
See application file for complete search history.

(56) References Cited

U.S. PATENT DOCUMENTS

| | | | | |
|---|---|---|---|---|
| 3,969,245 | A * | 7/1976 | Ramirez | 210/707 |
| 4,366,063 | A * | 12/1982 | O'Connor | 210/652 |
| 4,482,459 | A * | 11/1984 | Shiver | 210/639 |
| 5,043,050 | A * | 8/1991 | Herbst | 204/272 |
| 5,093,008 | A * | 3/1992 | Clifford, III | 210/725 |
| 5,423,962 | A * | 6/1995 | Herbst | 205/742 |
| 5,569,384 | A * | 10/1996 | Saatweber et al. | 210/651 |
| 6,179,977 | B1 * | 1/2001 | Herbst | 204/242 |
| 6,241,861 | B1 * | 6/2001 | Herbst | 204/229.6 |
| 6,613,202 | B2 * | 9/2003 | Herbst et al. | 204/270 |
| 6,719,894 | B2 * | 4/2004 | Gavrel et al. | 205/744 |
| 6,746,593 | B2 * | 6/2004 | Herbst | 205/757 |
| 7,186,344 | B2 * | 3/2007 | Hughes | 210/652 |
| 7,264,732 | B2 * | 9/2007 | Bradley | 210/660 |
| 7,520,342 | B2 * | 4/2009 | Butler et al. | 175/66 |
| 7,645,387 | B2 * | 1/2010 | Jensen et al. | 210/652 |

* cited by examiner

*Primary Examiner*—Ana M Fortuna
(74) *Attorney, Agent, or Firm*—Edwin H. Crabtree; Ramon L. Pizarro

(57) ABSTRACT

An in situ system used for treating an oil and gas well drilling fluid and treating water after a well is completed. The system includes a fluid treatment unit used in a reserve pit and a water treatment unit disposed next to the pit. The fluid treatment unit includes a floating electrocoagulation unit in the reserve pit for destabilizing contaminates in the fluid and dropping out stable precipitates. The clear treated fluid is then pumped, using a submersible pump, to the water treatment unit. The water treatment includes a number of components including a pre-filter, an activated carbon filter and a heat exchanger for first treating the fluid. The filtered and heated fluid is then piped into a reverse osmosis unit for removing salt and any remaining minerals found therein. From the reverse osmosis unit, approximately 70 to 80% of the filtered water is cleaned and piped to a clean water storage tank for reuse. Reject water from the reverse osmosis unit is transferred to a water preheater and a primary and secondary distillation unit for converting the heated water to steam. The steam is now piped to a condenser where the steam is cooled to distilled, clean water. The remaining clean water from the condenser is now transferred to the clean water storage tank.

18 Claims, 2 Drawing Sheets

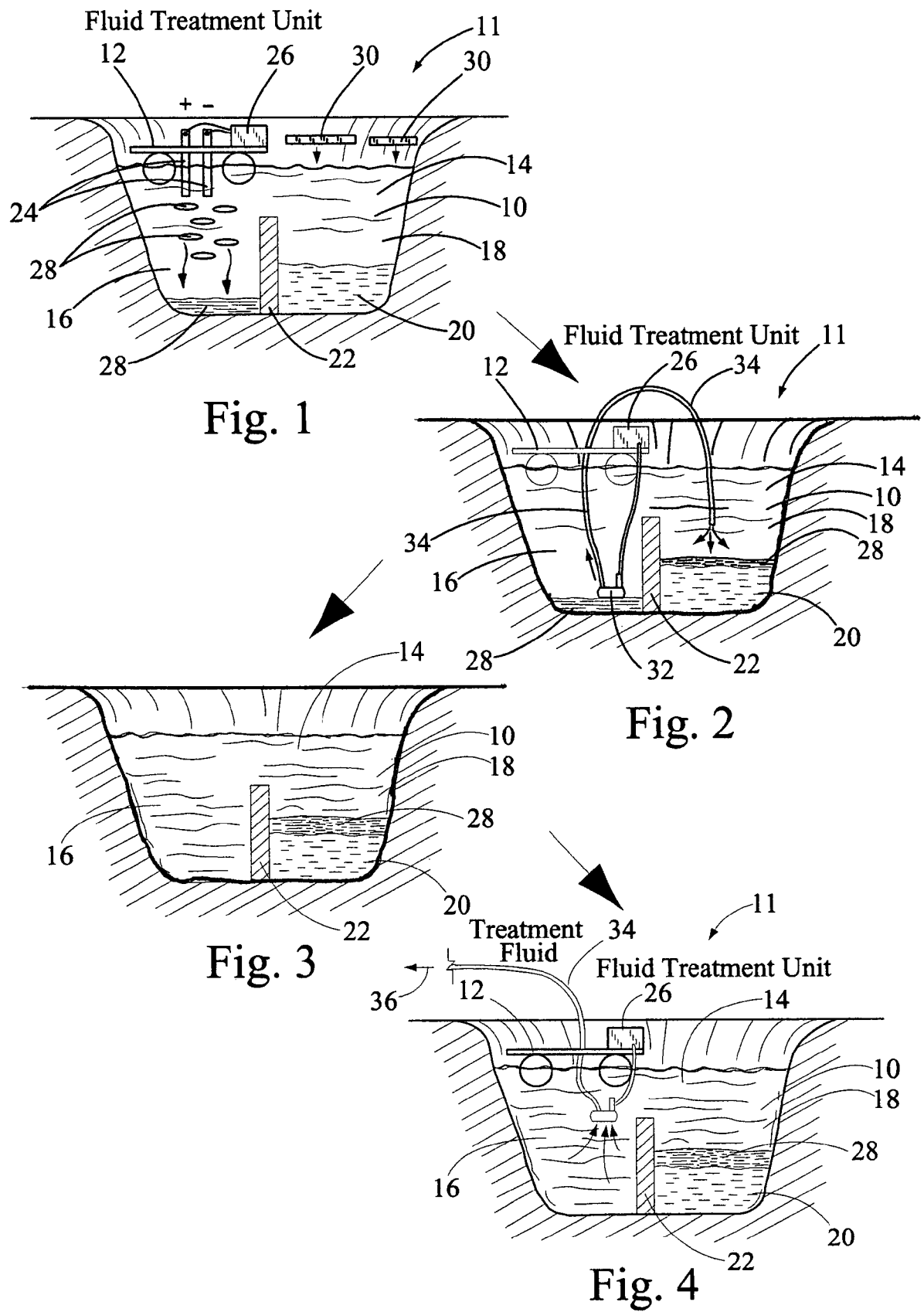

SITU SYSTEM AND METHOD FOR TREATING AN OIL AND GAS WELL DRILLING FLUID

BACKGROUND OF THE INVENTION (a) Field of the Invention

This invention relates to a system and a method for treating wastewater from an oil and gas drilling operation and more particularly, but not by way of limitation, to an in situ system and method for treating an oil and gas well drilling fluid next to a drilling site and greatly reducing various types of contaminates held in suspension in the fluid and creating reusable water for addition drilling or discharge into a ground surface without violating any environmental state and federal regulations.

(b) Discussion of Prior Art

The treating and cleaning of drilling fluids from an oil and gas well drilling operation has long been a problem waiting for a solution. One typical solution is to allow the water to evaporate from a reserve pit next to the drilling rig. This solution can take years for the water to evaporate and prior to burying the remaining solids left in the pit. Also, animals and birds can be trapped in the pit during the time the pit is left open and exposed. There have been efforts employed to shorten the evaporation period by pumping the fluid through sprinklers. This effort works fairly well until the fluid becomes more and more viscous and the surface tension of the water becomes denser. At this time, less and less water evaporation occurs and the fluid becomes more dense until it can no longer be pumped effectively.

Chemical treatment of the drilling fluid can be employed to remove solids, but the water phase of the fluid is loaded with salt and dissolved minerals that make the water undesirable for further use. Solidification of the drilling fluid is an option, but this leaves a potential environmental danger if rain or surface water disturbs the site during subsequent time periods. Electrocoagulation has been employed in the past on drilling sites, but this method of treating the fluid leaves some of the minerals and almost all of the salt in the treated water.

Therefore and because the above-mentioned systems and methods are ineffective in removing all of the contaminates in a drilling fluid, there is no single technology that will solve the overall problem. The subject invention described herein uses a series of technologies to the solve the entire problem and convert the water from the drilling fluid into a very pure form that can be reused as a drilling fluid or discharged into the environment without damage thereto.

In U.S. Pat. No. 6,613,202 to Herbst et al. and U.S. Pat. Nos. 5,043,050, 5,423,962, 6,179,977, 6,241,861 and 6,746,593 to Herbst, the inventor of the subject invention, Robert J. Herbst describes different types of improved electrolytic, electrochemical and electrocoagulation water treatment processes for treating aqueous, contaminated solutions and precipitating various organic and inorganic materials suspended in the solution. The technology described in these patents is incorporated into various individual features of the subject in situ system and method of treating drilling fluids.

As mentioned above, none of the above mentioned prior art electrolytic, electrochemical and electrocoagulation systems and processes for treating wastewater disclose or teach individually or in combination the unique features of the subject invention which provides for treating large volumes of drilling fluids in situ with reliability and functionality not obtainable with other types of wastewater treatment systems.

SUMMARY OF THE INVENTION

In view of the foregoing, it is a primary objective of the subject invention to treat a drilling fluid in a reserve pit and create a pure form of water that can be reused in a drilling operation reducing the cost of hauling water to the drilling site or discharged into a ground surface without violating state and federal environmental regulations. Also, the system can be used on treating water produced from an oil and gas well after the well is completed and production begins.

Another object of the invention is the system is designed to treat a drilling fluid with both complex and with variable contaminates and recover byproducts which heretofore were discarded.

Still another object of the invention is the system is adapted for convenience and efficiency by treating the drilling fluid in situ in a reserve pit next to a drilling rig operation. Also, the system can be used in abandoned reserve pits that are subject to an environmental cleanup operation.

The subject in situ system for treating a drilling fluid is adapted for receipt next to a divided reserve pit disposed next to a drilling rig. The drilling fluid, used in the drilling operation, is discharged into a first side of the reserve pit. Drill bit cuttings from a well being drilled are discharged into a second side of the reserve pit.

The system broadly includes a fluid treatment unit used for treating the drilling fluid in the reserve pit and a water treatment unit for treating the fluid received from the fluid treatment unit.

The fluid treatment unit includes a floating electrocoagulation unit with positive and negative charged electrodes received in the drilling fluid in the first side of the pit. A generator is connected to the electrodes for applying positive and negative direct current thereto and destabilizing contaminates in the fluid. Heavy sludge, colloidal solids and dissolved metals form stable precipitates that settle to the bottom of the first side of the pit. Also, any emulsified oil that is released from the fluid and floats to the top of the reserve pit is easily removed using adsorbent pads floated on top of the fluid surface.

The settled precipitates are then pumped, using a submersible pump, into the second side of the pit and allowed to settle on top of the cuttings. This allows the untreated fluids in the second side of the pit to be forced into the first side of the pit for the electrocoagulation treatment.

The submersible pump is now floated over the deepest part of the first side of the pit to decant the cleanest fluid for further processing. This feature allows for removing the fluid from the reserve pit downward and harvesting as much of the relatively clear water as possible.

The water treatment unit now receives the clear water from the fluid treatment unit. The water treatment unit is made up of a number of components, disposed next to the reserve pit, for further treating the drilling fluid and creating clean water. The first component is a pre-filter with a 20 micron filter bag to collect any residual solids in the fluid. The pre-filter removes any solids in the fluid prior to further treatment.

The fluid then travels through an activated carbon filter to remove any residual dissolved heavy metals, such as copper and zinc, and remove any residual hydrocarbons that may have escaped the adsorbent pads used in the reserve pit. Small amounts of other dissolved minerals, such as calcium and silica, are also removed. The filtered fluid is now piped to a heat exchanger, where the temperature of the fluid is increased to a range of 90 to 110 degrees F.

The filtered and heated fluid is then piped and introduced into a reverse osmosis unit for removing salt and any remaining minerals found therein. From the reverse osmosis unit, approximately 70 to 80% of the filtered water will be permeate or clean product water, which is piped to a clean water storage tank for reuse in the drilling operation or for other uses. Approximately 20 to 30% of the filtered water from the reverse osmosis unit will be influent or reject water.

The reject water from the reverse osmosis unit is transferred to a water pre-heater where it is heated and transferred to a primary distillation unit and a secondary distillation unit. The two distillation units convert the heated water to steam. The steam is now piped to a condenser where the steam is cooled to distilled water. The distilled water is now transferred to the clean water storage tank.

From the combination of the treating of the drilling fluid in the reserve pit and using the water treatment unit described above, 80 to 90% of the drilling fluid is converted to clean water. Also, the reserve pit is left with minimal sludge that dries quickly and can be buried in a week or two. Also, solidified salt brine from the two distillation units can recovered for processes using salt components or it can be buried with the sludge in the reserve pit.

These and other objects of the present invention will become apparent to those familiar with different types of systems and methods for electrolytic, electrochemical or electrocoagulation treatment of contaminated water and drilling fluids when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for its practical application and in which:

FIG. 1 illustrates a cross-sectional view of a divided reserve pit with a floating electrocoagulation unit received on top of the surface of a drilling fluid in a first side of the pit.

FIG. 2 illustrates a cross-sectional view of the reserve pit with a submersible pump transferring sludge, colloidal solids and metal precipitates to a second side of the reserve pit.

FIG. 3 shows the reserve pit with the sludge settled on top of drill bit cuttings in the second side of the pit and clear water allowed to stand in both sides of the pit.

FIG. 4 illustrates the submersible pump raised close to the top of the fluid surface and above the first side of the pit. The treated fluid is shown being pumped to a water treatment unit next to the reserve pit and described in FIG. 5.

DESCRIPTION OF THE PREFERRED EMBODIMENTS

Figure 5:
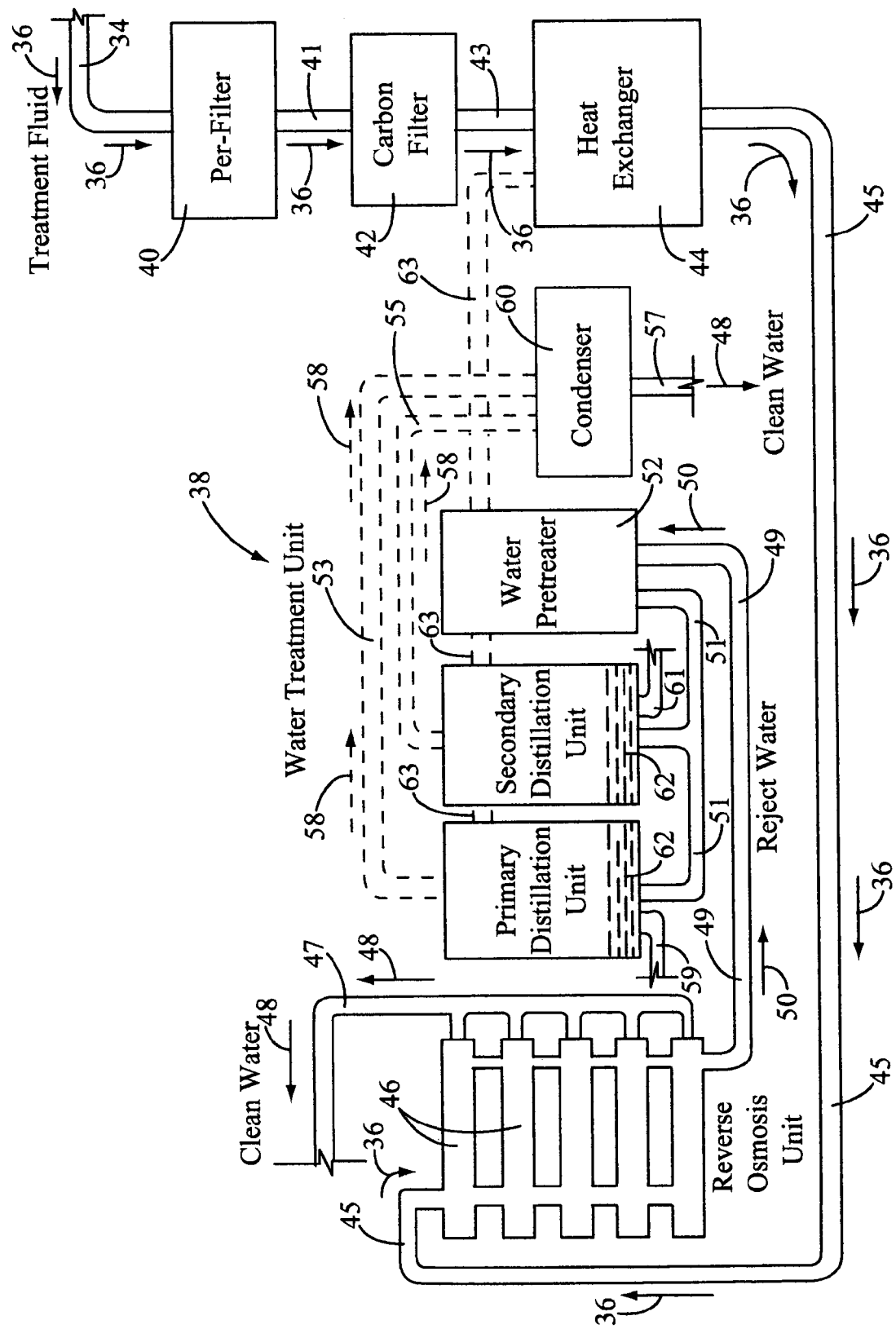
FIG. 5 shows the various components making up the water treatment unit. The water treatment unit is used for converting the treated fluid from the reserve pit to clean water that can be transferred to a clean water storage tank for further use in the drilling operation.

At the start of the drilling fluid cleaning process, the fluid in a reserve pit is first analyzed to determine the amount of solids in the pit and the pH of the fluid in the pit. If necessary, an acid or caustic can be added to the pit to bring the pH into a most effective range for the system and method to work as efficiently as possible. Generally, the pH needs to be between 5 and 8. A test is run on a bench scale electrocoagulation unit on one gallon of fluid. This test will demonstrate the results that will be produced by the first step of using the electrocoagulation unit in the pit and indicate the amount of watt hours of electricity needed per gallon of fluid. Based on this information, a mathematical determination can then be made of the amount of watt hours needed to treat the entire reserve pit. A typical pit may contain from 10,000 to 50,000 ppm of total solids and as much as 5,000 to 15,000 ppm of salt. A heat exchanger is employed in the system to utilize waste heat from an exhaust of a motor driven direct current generator. The feature of capturing waste heat allows the system to be more effective and useful in deterring the freezing of the pit during winter months.

In FIG. 1, a cross-sectional view of a divided reserve pit 10 is shown for receiving a fluid treatment unit, having general reference numeral 11. The fluid treatment unit 11 includes a floating electrocoagulation unit 12 received on top of a surface of a drilling fluid 14 stored in a first side 16 of the pit 10. The reserve pit 10 also includes a second side 18 for receiving drill bit cuttings 20. The pit 10 is divided using a weir 22 or similar temporary reserve pit divider. While the divided reserve pit 10 is shown in the drawings, it should be kept in mind the subject invention will work equally well with an undivided pit, lagoon and other types of containment reservoirs used for holding the drilling fluid 14 to be treated.

The floating electrocoagulation unit 12 includes positive and negative charged electrodes 24 received in the drilling fluid 14. A generator 26 is connected to the electrodes 24 for applying positive and negative direct current thereto and destabilizing contaminates in the fluid. Heavy sludge, colloidal solids and dissolved metals form stable precipitates 28 that settle to a bottom of the first side 16 of the pit 12. Also, any emulsified oil that is released from the fluid and floats to the top of the reserve pit is easily removed using adsorbent pads 30 floated on top of the fluid surface.

In FIG. 2, a cross-sectional view of the reserve pit 10 is shown with a submersible pump 32 suspended from the floating electrocoagulation unit 12. The pump 32 is electrically connected to the generator 26 and includes a pump hose 34. The pump hose 34 is used for transferring the sludge, colloidal solids and metal precipitates 28 to the second side 18 of the reserve pit 10 and on top of the drill bit cuttings 20. At this time, the untreated fluid 14 in the second side 18 of the pit 10 is forced into the first side 16 of the pit for the further electrocoagulation treatment.

In FIG. 3, the reserve pit 10 is shown with the stable precipitates 28 settled on top of drill bit cuttings 20 in the second side of the pit. Clear water is now allowed to stand in the pit prior to further treatment.

In FIG. 4, the submersible pump 32 is shown floated over the deepest part of the first side 16 of the pit 10 to decant the cleanest fluid for further processing. This feature allows for removing a treated fluid, shown as arrow 36, from the reserve pit 10. As much of the treated fluid 36 is harvested from the pit leaving only the stable precipitates 28 and the drill bit cuttings 20 left therein to dry and to be buried at a later date.

In FIG. 5, various components making up a water treatment unit are shown with the unit having a general reference numeral 38. The water treatment unit 38 is used for converting the treated fluid 36 from the reserve pit 10 to clean water. The clean water can then be transferred to a clean water storage tank for further use in the drilling operation. The clean water storage tank is not shown in the drawings.

The pump hose 34 or a pipe is connected to a pre-filter 40. The pre-filter includes a 20 micron filter bag to collect any residual solids left in the fluid. The pre-filter 40 removes any solids in the fluid prior to further treatment.

The fluid 36 then travels via a pipe 41 to an activated carbon filter 42. The carbon filter 42 is used to remove any residual dissolved heavy metals, such as copper and zinc, and remove any residual hydrocarbons that may have escaped the adsorbent pads 30 used in the reserve pit 10. Also, small amounts of other dissolved minerals, such as calcium and silica, are removed. The filtered fluid 36 is now piped via a pipe 43 to a heat exchanger 44, where the temperature of the fluid is increased to a range of 90 to 110 degrees F.

The filtered and heated fluid 36 is now piped via pipe 45 and introduced into a reverse osmosis unit 46 for removing salt and any remaining minerals found therein. From the reverse osmosis unit 46 approximately 70 to 80% of the filtered fluid will be permeate or a clean water, shown as arrow 48, which is transferred via pipe 47 to a clean water storage tank for reuse in the drilling operation or for other uses. The clean water 48 helps offset the cost of the treating of the drilling fluid 14 in the reserve pit 10. Also, the clean water 48 is at a temperature of approximately 100 degrees F., which adds to the savings by not needing to be heated for subsequent uses by the drill operator. Approximately 20 to 30% of the filtered water from the reverse osmosis unit 46 is influent or reject water, shown as arrow 50. The reject water 50 contains up to 100% of the contaminants in the treated fluid 36 entering the reverse osmosis unit 46.

It should be mentioned that the reverse osmosis unit 46 is considerably more efficient because of the prior treating of the fluid by the electrocoagulation unit 12, the pre-filter 40, the carbon filter 42 and the heat exchanger 44. The electrocoagulation unit 12 removes 50% or more of the contaminates prior to the fluid being treated in the reverse osmosis unit 46. Also, the electrocoagulation unit 12 reduces the surface tension on the water thereby reducing the necessary pumping pressure required in the reverse osmosis unit 46. Further, membrane fouling by contaminants such as oil, silica, calcium, iron and the like is dramatically reduced or eliminated by reducing pump pressure and extending membrane life. Still further, the increasing of the temperature of the fluid helps optimize the efficiency of the reverse osmosis unit and prolongs the life of the membranes therein.

The reject water 50 from the reverse osmosis unit 46 is transferred via pipe 49 to a water pre-heater 52. The reject water 50 is now heated and transferred to a primary distillation unit 54 and a secondary distillation unit 56. The two distillation units 54 and 56 convert the heated water to steam, shown as dashed arrows 58. The steam 58 is now transferred via pipes 53 and 55, shown in dashed lines, piped to a condenser 60, where the steam 58 is cooled to distilled, clean water 48. The clean water 48 is now transferred via pipe 57 to the clean water storage tank.

As the water is boiled away in the distillation units 54 and 56, brine 62 collects in the bottom of the units. As concentration of the brine 62 builds up to 30 to 40%, it is discharged out pipes 59 and 61, where it is cooled and solidified. Also, waste heat from the distillation units 54 and 56 is captured and transferred via heat pipes, shown as dashed lines 63, to the water pre-heater 60 and the heat exchanger 44. This feature of using the waste heat from the distillation units greatly improves the overall efficiency of the water treatment unit 38 by pre-heating the treated fluid 36 and the reject water 50 prior to further treatment, as described above.

From the combination of the treating of the drilling fluid in the reserve pit and using the water treatment unit described above, 80 to 90% of the drilling fluid is converted to clean water. Also, the reserve pit is left with minimal sludge that dries quickly and can be buried in a week or two. Also, solidified salt brine from the two distillation units can recovered for processes using salt components or it can be buried with the sludge in the reserve pit.

While the invention has been particularly shown, described and illustrated in detail with reference to the preferred embodiments and modifications, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. An in situ system used for treating a oil and gas well drilling fluid discharged into a reserve pit next to an oil and gas drilling operation, the system treating the fluid and providing clean water for transfer to a clean water storage tank for further use in the drilling operations, the system comprising:

a fluid treatment unit adapted for use in the reserve pit, said fluid treatment unit comprising:

an electrocoagulation unit with a generator disposed next to the reserve pit for destabilizing contaminants in the drilling fluid and dropping out stable precipitates at the bottom of the reserve pit;

a submersible pump electrically connected to the generator for pumping treated fluid from the reserve pit;

a water treatment unit for treating the treated fluid from the reserve pit, said water treatment comprising:

a heat exchanger connected to said pump for receiving the treated fluid, said heat exchanger heating the fluid;

a reverse osmosis unit connected to said heat exchanger, said reverse osmosis unit for removing salt and any remaining mineral found in the fluid and discharging filtered clean water to a storage tank and reject water therefrom, the filtered clean water is transferred to a clean water storage tank for reuse;

a primary distillation unit connected to said heat exchanger for treating heated reject water, said primary distillation unit for converting the reject water to steam;

a condenser connected to said primary distillation unit, said condenser for cooling the steam to distilled clean water, the clean water from said condenser transferred to the clean water storage tank.

2. The system as described in claim 1 further including at least one adsorbent pad for receipt on top of the drilling fluid in the reserve pit and removing emulsified oil floating on top of the drilling fluid.

3. The system as described in claim 1 wherein said electrocoagulation unit is a floating electrocoagulation unit disposed on top of the drilling fluid and above a first side of the reserve pit.

4. The system as described in claim 3 wherein said submersible pump is used for removing the stable precipitates in the first side of the reserve pit and transferring the precipitates to a second side of the pit.

5. The system as described in claim 1 further including a pre-filter connected between said pump and said heat exchanger for receiving the treated fluid from said pump, said pre-filter filtering out any remaining residual solids in the fluid.

6. The system as described in claim 5 further including an activated carbon filter connected between said pre-filter and said heat exchanger, said carbon filter removing any residual dissolved metals and residual hydrocarbons.

7. The system of claim 1 further including a second distillation unit connected to said reject water heat exchanger and said primary distillation unit and condenser for directing steam to said condenser.

8. An in situ system used for treating an oil and gas well drilling fluid discharged into a reserve pit having a first and a second side, the pit disposed next to an oil and gas drilling operation, the system treating the fluid and providing clean water for transfer to a clean water storage tank for further use in the drilling operation, the system comprising:
   a fluid treatment unit adapted for use in the reserve pit, said fluid treatment unit comprising:
      a floating electrocoagulation unit with generator disposed on top of the drilling fluid and above the first side of reserve pit for destabilizing contaminates in the drilling fluid and dropping out stable precipitates;
      a submersible pump electrically connected to the generator for pumping the treated fluid from the reserve pit;
   a water treatment unit for treating the treated fluid from the reserve pit, said water treatment unit comprising:
      a pre-filter for receiving the treated fluid from said pump, said pre-filter filtering out any remaining residual solids in the fluid;
      an activated carbon filter connected to said pre-filter, said carbon filter removing any residual dissolved metals and residual hydrocarbons;
      a heat exchanger connected to said carbon filter, said heat exchanger heating the fluid to a range of 90 to 110 degrees F.
      a reverse osmosis unit connected to said heat exchanger, said reverse osmosis unit for removing salt and any remaining minerals found in the fluid and discharging the filtered, clean water and reject water therefrom, the filtered, clean water transferred to the clean water a storage tank for reuse;
      a water pre-heater connected to said reverse osmosis unit, said pre-heater for receiving reject water from said reverse osmosis unit and heating the reject water;
      a primary and a secondary distillation units connected to said water pre-heater, said units for converting the heated water to steam;
      a condenser connected to said distillation units, said condenser for cooling the steam to distilled, clean water, the clean water from said condenser transferred to the clean water storage tank.

9. The system as described in claim 8 further including a plurality of adsorbent pad for receipt on and floating on top of the drilling fluid in the reserve pit and removing emulsified oil floating on top of the drilling fluid.

10. The system as described in claim 8 wherein said submersible pump is used for removing the stable precipitates in the first side of the reserve pit and transferring the precipitates to the second side of the pit.

11. The system as in claim 8 wherein the second distillation unit is connected to the first distillation unit.

12. A method for treating an oil and gas well drilling fluid discharged into a reserve pit next to an oil and gas drilling operation, the method treating the fluid and providing clean water for transfer to a clean water storage tank for further use in the drilling operation, the steps comprising:
   treating the drilling fluid with an electrocoagulation unit with generator disposed next to the reserve pit, destabilizing contaminates in the drilling fluid and dropping out stable precipitates in a bottom of the reserve pit;
   pumping the treated fluid from the reserve pit using a submersible pump electrically connected to the generator;
   heating the treated fluid using a heat exchanger, the heat exchanger connected to the pump;
   removing salt and any remaining minerals in the treated fluid using a reverse osmosis unit connected to the heat exchanger and discharging filtered clean water and reject water therefrom, the filtered, clean water transferred to a clean water storage tank for reuse;
   heating the reject water using a pre-heater connected between the reverse osmosis unit and the primary distillation unit prior to transferring the reject water to the primary distillation unit
   converting the reject water to steam; and
   condensing the steam using a condenser connected to the primary distillation unit, the condenser cooling the steam to distilled, clean water, the clean water from the condenser is transferred to the clean water storage tank.

13. The method as described in claim 12 further including a step of placing adsorbent pads on top of the drilling fluid in the reserve pit and removing emulsified oil floating on top of the drilling fluid using the pads and after the step of destabilizing the contaminates in the drilling fluid.

14. The method as described in claim 12 wherein the step of treating the drilling fluids using an electrocoagulation unit includes floating the unit on top of the drilling fluid and above a first side of the reserve pit.

15. The method as described in claim 12 wherein the submersible pump used for pumping the treated fluid from the reserve pit also includes removing the stable precipitates in the first side of the reserve pit and transferring the precipitates to a second side of the pit prior to pumping the treated fluid therefrom.

16. The method as described in claim 12 further includes the step filtering out any remaining residual solids in the treated fluid using a pre-filter connected between the pump and the heat exchanger prior to heating the fluid using the heat exchanger.

17. The method as described in claim 16 further including the step of removing any residual dissolved metals and residual hydrocarbons using an activated carbon filter connected between the pre-filter and the heat exchanger prior to heating the fluid using the heat exchanger.

18. The method as described in claim 13, further including a step of converting the reject water to steam by using a second distillation unit connected to the pre-heater and the primary distillation unit; steam produced in the second distillation unit is directed to the condenser.

* * * * *